US008082788B1

(12) United States Patent
Fu

(10) Patent No.: US 8,082,788 B1
(45) Date of Patent: Dec. 27, 2011

(54) MEMS LOAD CELL AND STRAIN SENSOR

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 133 days.

(21) Appl. No.: 12/340,146

(22) Filed: Dec. 19, 2008

Related U.S. Application Data

(60) Provisional application No. 61/015,656, filed on Dec. 20, 2007.

(51) Int. Cl.
*G01C 19/00* (2006.01)

(52) U.S. Cl. ............... 73/504.04; 73/504.03; 73/504.12; 73/504.15

(58) Field of Classification Search ............ 73/774, 73/777, 780, 862.041–862.043, 504.01–504.16
See application file for complete search history.

(56) References Cited

U.S. PATENT DOCUMENTS

| 6,370,954 | B1 * | 4/2002 | Zerbini et al. ............. 73/514.01 |
| 6,862,938 | B1 * | 3/2005 | Park et al. ................ 73/780 |
| 6,882,083 | B2 * | 4/2005 | Jerman et al. ............. 73/504.12 |
| 7,509,870 | B2 * | 3/2009 | Aebersold et al. ......... 73/780 |
| 2001/0043023 | A1 * | 11/2001 | Jerman et al. ............. 310/309 |
| 2002/0189352 | A1 * | 12/2002 | Reeds et al. .............. 73/504.04 |
| 2005/0210978 | A1 * | 9/2005 | Lang et al. ............... 73/504.12 |
| 2007/0085533 | A1 * | 4/2007 | Bolle et al. .............. 324/244 |
| 2007/0139599 | A1 * | 6/2007 | Lee ...................... 349/141 |
| 2007/0180907 | A1 * | 8/2007 | Krieg et al. .............. 73/504.11 |
| 2007/0214883 | A1 * | 9/2007 | Durante et al. ........... 73/504.04 |
| 2007/0214890 | A1 * | 9/2007 | Mukherjee ............... 73/514.29 |
| 2009/0064780 | A1 * | 3/2009 | Coronato et al. .......... 73/504.08 |
| 2009/0100930 | A1 * | 4/2009 | Coronato et al. .......... 73/504.12 |
| 2009/0273255 | A1 * | 11/2009 | Maeda et al. ............. 310/308 |

OTHER PUBLICATIONS

Jun Guo et al., "High-gain Mechanically Amplified Capacitive Strain Sensor," 2005 IEEE, pp. 464-467, Oct. 30-Nov. 3.

* cited by examiner

*Primary Examiner* — Lisa Caputo
*Assistant Examiner* — Jonathan Dunlap
(74) *Attorney, Agent, or Firm* — Patent Law Group LLP; David C. Hsia

(57) ABSTRACT

A sensor includes at least one stationary pad with comb teeth, a hub, at least one actuator spoke coupled to a location on the hub, and at least one sensing spoke extending from the hub. The sensing spokes have comb teeth generally interdigitated with the comb teeth of the stationary pad. The location of the coupling between the actuator spoke and the hub offsets a line of action of a force on the actuator spoke from a center of rotation of the hub.

13 Claims, 5 Drawing Sheets

MEMS LOAD CELL AND STRAIN SENSOR

CROSS REFERENCE TO RELATED APPLICATIONS

This application claims the benefit of U.S. Provisional Application No. 61/015,656, entitled "MEMS Load Cell and Strain Sensor," filed on Dec. 20, 2007, which is incorporated herein by reference.

FIELD OF INVENTION

This invention relates to load cells and strain sensors.

DESCRIPTION OF RELATED ART

A load cell is typically an electronic device (transducer) that is used to convert a force into an electrical signal. This conversion is indirect and happens in two stages. Through a mechanical arrangement, the force being sensed deforms a strain gauge. The strain gauge converts the deformation (strain) to electrical signals. Normally, a load cell consists of four strain gauges in a Wheatstone bridge configuration, but is also available with one or two strain gauges. The electrical signal output is normally in the order of a few millivolts and requires amplification by an instrumentation amplifier before it can be used. The output of the transducer is plugged into an algorithm to calculate the force applied to the transducer. Although strain gauge load cells are the most common, there are other types of load cells as well.

SUMMARY

In one embodiment of the invention, a sensor includes at least one stationary pad with comb teeth, a hub, at least one actuator spoke coupled to a location on the hub, and at least one sensing spoke extending from the hub. The sensing spokes have comb teeth generally interdigitated with the comb teeth of the stationary pad. The location of the coupling between the actuator spoke and the hub offsets a line of action of a force on the actuator spoke from a center of rotation of the hub.

BRIEF DESCRIPTION OF THE DRAWINGS

Use of the same reference numbers in different figures indicates similar or identical elements.

DETAILED DESCRIPTION OF THE INVENTION

Figure 1:
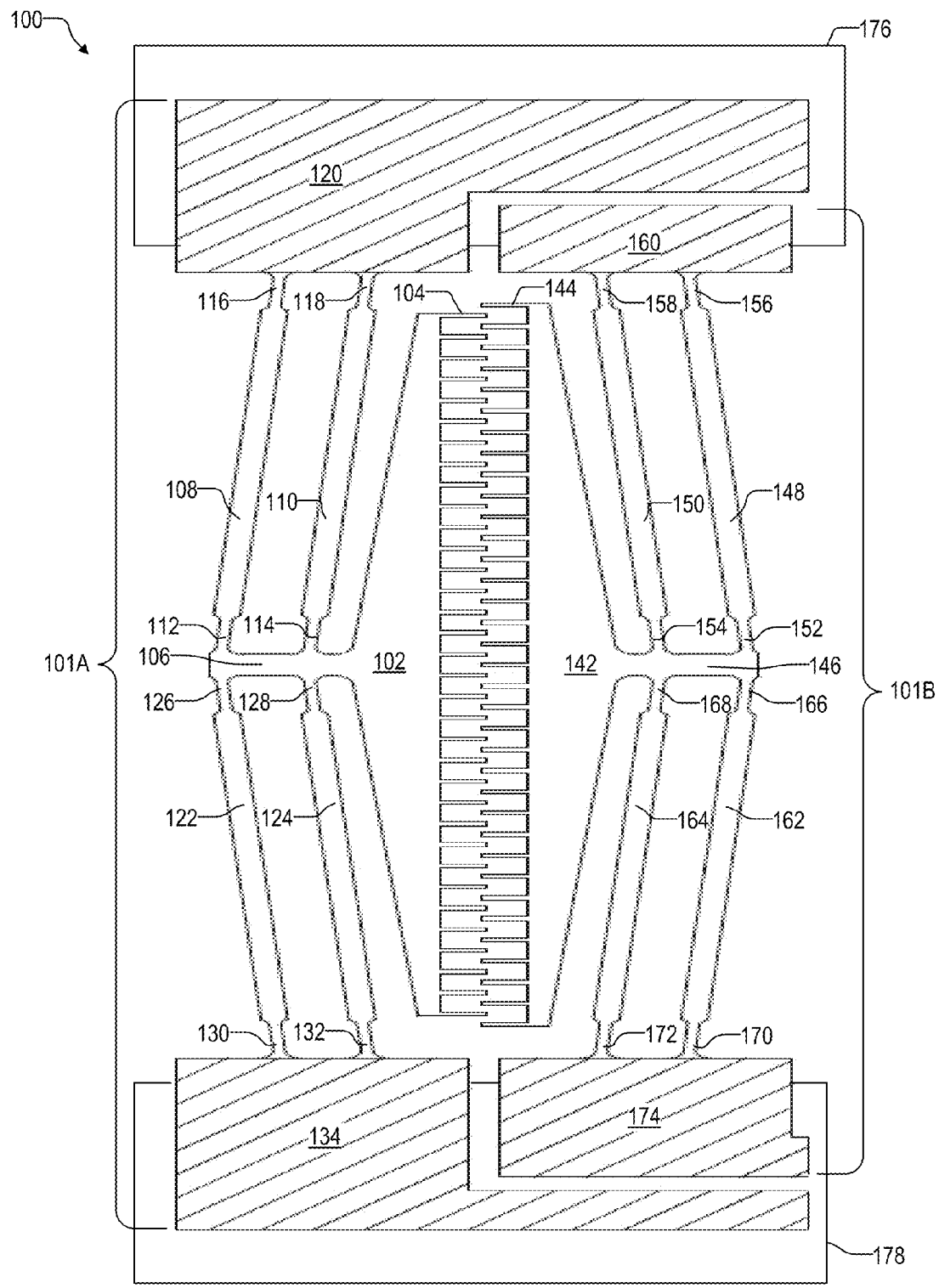
FIG. 1 illustrates a MEMS sensor in one embodiment of the invention.

FIG. 1 illustrates a MEMS sensor 100 in one embodiment of the invention. Sensor 100 can be used to measure load, strain, and other similar characteristics. Sensor 100 can be made using typical semiconductor manufacturing processes.

Sensor 100 includes a pair of opposing structures 101A and 101B. Left structure 101A includes a vertical central beam 102 with comb teeth 104 (only one is labeled for clarity) extending along the length of its right side and a horizontal center joint 106 extending from the center of its left side. Note that the use of directions is only for illustrative purposes and the actual orientation depends on application. Two buckling beams 108 and 110 have inner ends 112 and 114 connected to the top of center joint 106, and outer ends 116 and 118 connected to a movable pad 120. Two buckling beams 122 and 124 have inner ends 126 and 128 connected to the bottom of center joint 106, and outer ends 130 and 132 connected to a movable pad 134.

Similarly, right structure 101B includes a vertical central beam 142 with comb teeth 144 extending along the length of its left side and a horizontal center joint 146 extending from the center of its right side. Comb teeth 144 are generally interdigitated with comb teeth 104 of right structure 101A. Two buckling beams 148 and 150 have inner ends 152 and 154 connected to the top of center joint 146, and outer ends 156 and 158 connected to a movable pad 160. Two buckling beams 162 and 164 have inner ends 166 and 168 connected to the bottom of center joint 146, and outer ends 170 and 172 connected to a movable pad 174.

Movable pads 120 and 160 are mounted on a nonconductive common support 176 so they move in unison but they are electrically insulated from each other. Similarly, movable pads 134 and 174 are mounted on a nonconductive common support 178 so they move in unison but they are electrically insulated from each other.

In operation, one or more vertical forces cause common supports 176 and 178 to move vertically relative to each other. The vertical movement is translated and amplified by buckling beams 108, 110, 122, 124, 148, 150, 162, and 164 into horizontal movements of central beams 102 and 142. The horizontal movements of central beams 102 and 142 changes the electrical characteristics (e.g., capacitance) of comb teeth 104 and 144, which can be sensed and converted to determine the load, strain, and other similar characteristics.

In one embodiment, the end portions of the buckling beams have a thinner cross-section than the midsections so the ends act like springs or hinges. This allows each buckling beam to substantially rotate and minimize bending (i.e., the buckling beam remains straight) when the vertical forces are applied. For example, the end portions of the buckling beams can be thinner or the buckling beams can taper near its ends. Alternatively, the buckling beams can be shaped so they offset any bending and become straight when the vertical forces are applied.

Figure 2:
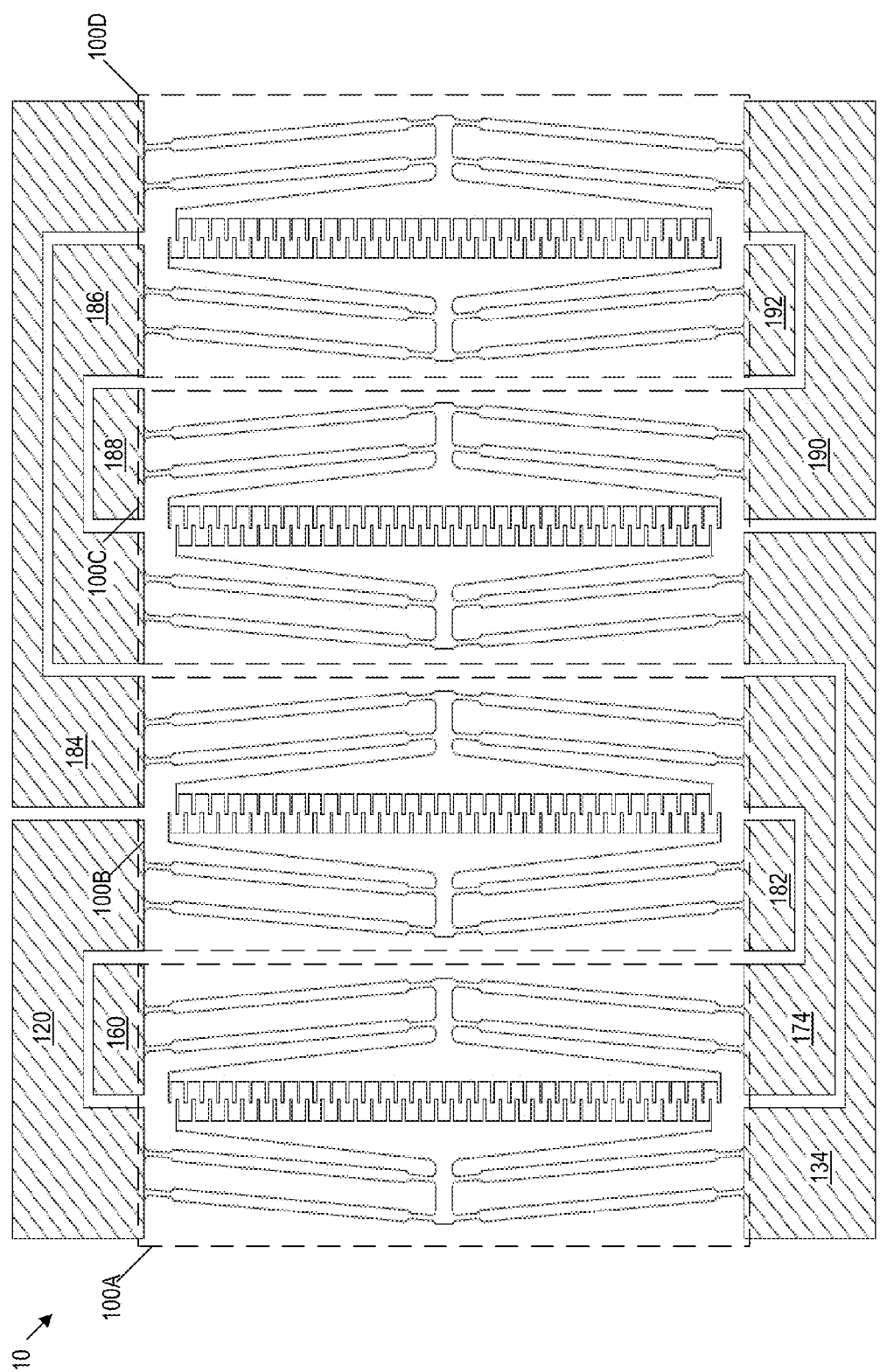
FIG. 2 illustrates a MEMS sensor including multiple MEMS sensors of FIG. 1 in one embodiment of the invention.

FIG. 2 illustrates a sensor 10 with multiple sensors of FIG. 1 for increasing the sensitivity of the sensor in one embodiment of the invention. Specifically, sensor 10 includes sensors 100A, 100B, 100C, and 100D. The outer ends of the buckling beams in the left structures of sensors 100A to 100D are coupled to common pads to form a first electrical path, and the outer ends of the buckling beams in the right structures of sensors 100A to 100D are coupled to common pads to form a second electrical path. Specifically, the first electrical path loops through a movable pad 182, the left structure of sensor 100B, a movable pad 120, the left structure of sensor 100A, a movable pad 134, the left structure of sensor 100C, a movable pad 186, the left structure of sensor 100D, and a movable pad 192. The second path loops through a movable pad 160, the right structure of sensor 100A, a movable pad 174, the right structure of sensor 100B, a movable pad 184, the right structure of sensor 100D, a movable pad 190, the right structure of sensor 100C, and a movable pad 188. A first pair of leads can be connected to movable pads 160 and 188, and a second pair of leads can be connected to movable pad 182 and 192 to sense the changes in the electrical characteristics (e.g., capacitance) of the comb teeth in sensors 100A to 100D.

Figure 3:
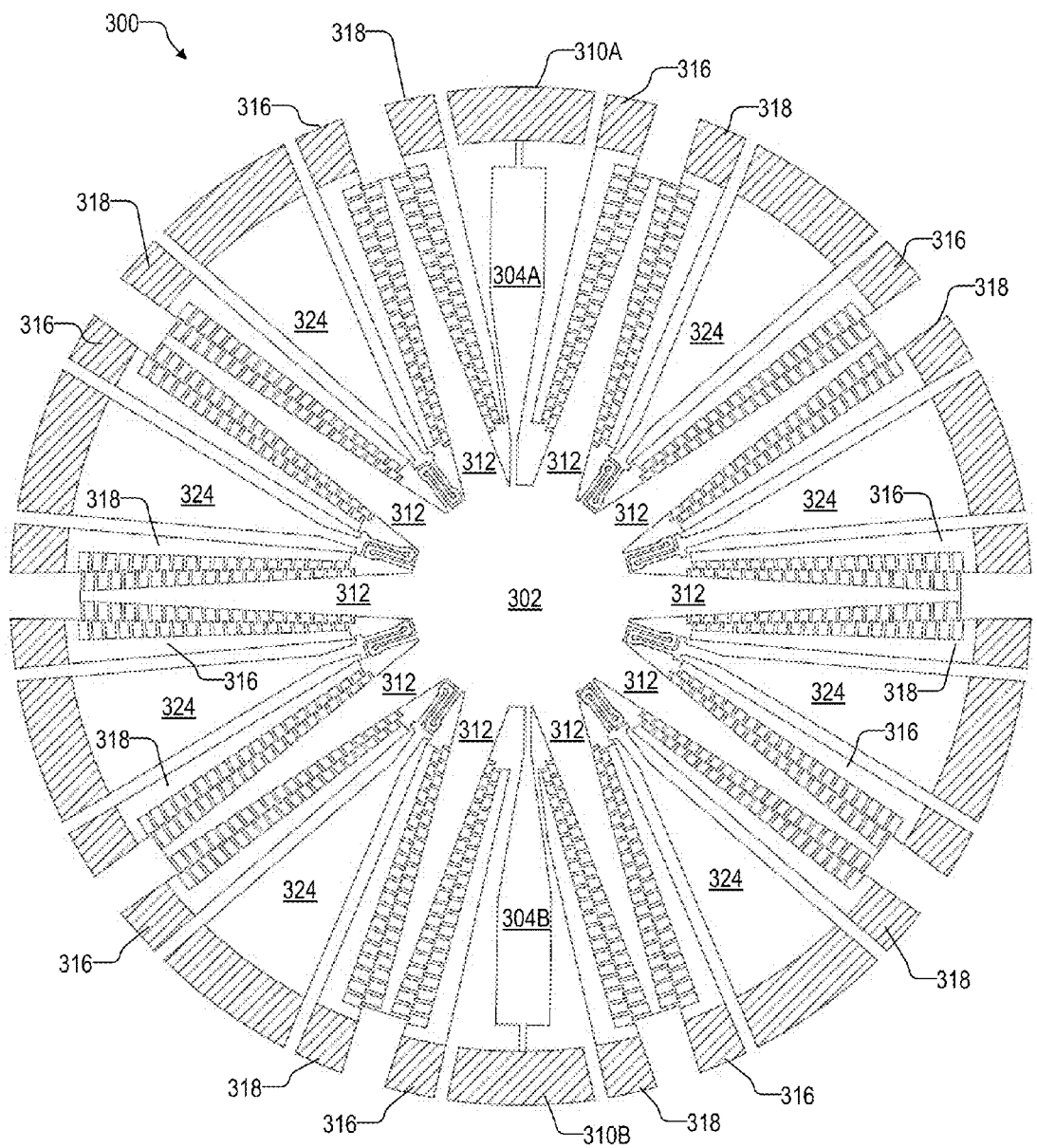
FIG. 3 illustrates a MEMS sensor in one embodiment of the invention.

FIG. 3 illustrates a MEMS sensor 300 in one embodiment of the invention. Sensor 300 can be used to measure load, strain, and other similar characteristics. Sensor 300 can be made using typical semiconductor manufacturing processes.

Sensor 300 includes a hub 302, actuator spokes 304A and 304B coupled to diametrically opposed points on the perimeter of hub 302, rotatable sensing spokes 312 extending in a radial pattern from the perimeter of hub 302, pairs of stationary sensing pads 316 and 318 where each pair sandwiches a sensing spoke 312 to form a sensing group, and stationary spokes 324 coupled to the perimeter of hub 302 where each stationary spoke is located between two adjacent sensing groups.

Figure 4:
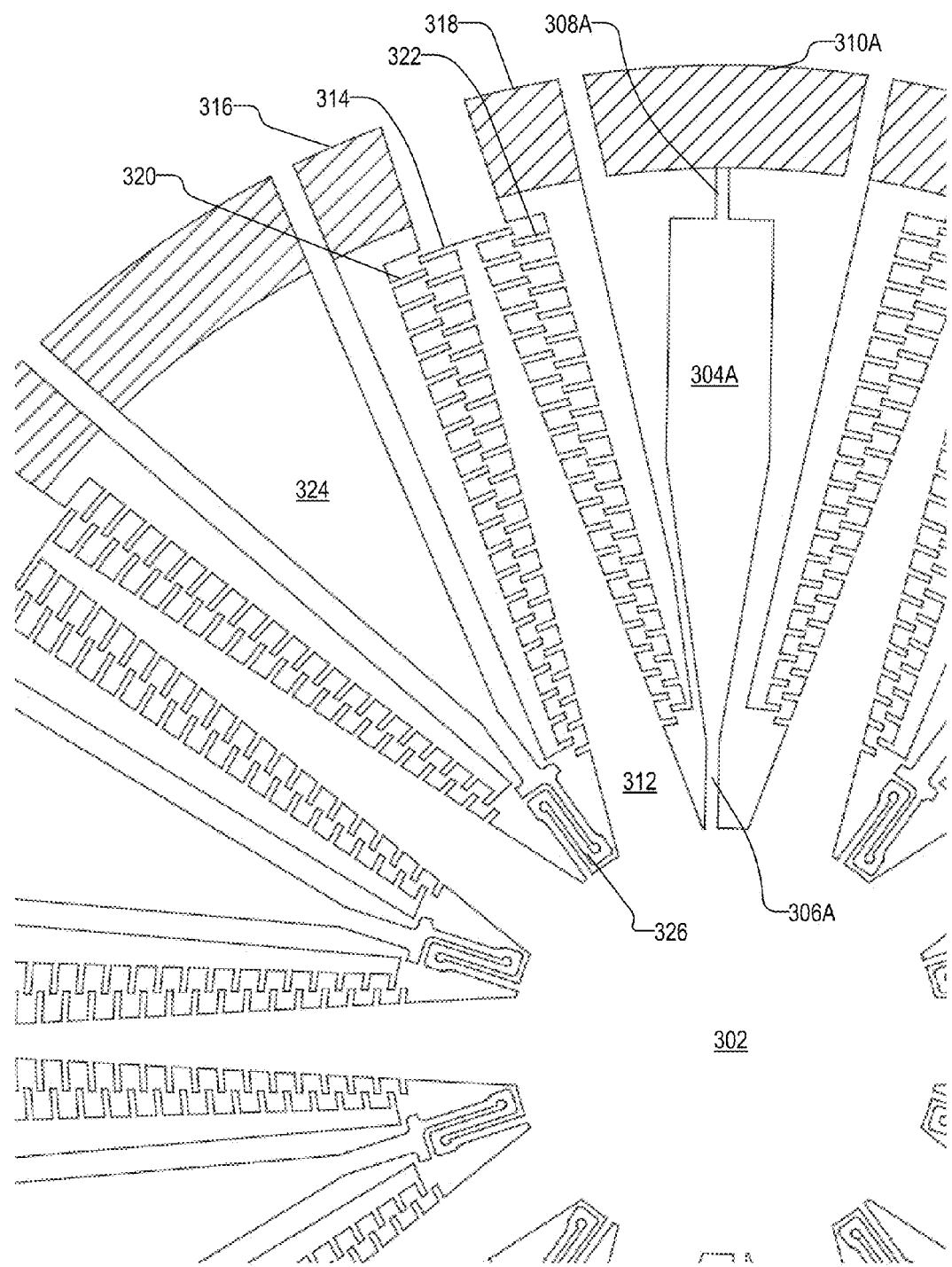
FIG. 4 illustrates an enlarged view of part of FIG. 3 in one embodiment of the invention.

Referring to FIG. 4, actuator spoke 304A has an inner end 306A coupled to hub 302, and an outer end 308A coupled to a movable pad 310A. Symmetrically, actuator spoke 304B (FIG. 5) has an inner end 306B (FIG. 5) coupled to hub 302, and an outer end 308B (FIG. 5) coupled to a movable pad 310B. In one embodiment, the end portions of the actuator spokes have a thinner cross-section than the midsection of the actuator spokes so they act like springs or hinges. This allows forces acting on the sensor to rotate hub 302 without compressing the actuator spokes or the hub.

Each sensing spoke 312 has comb teeth 314 (only one is labeled for clarity) extending from both sides along its length. Comb teeth 314 faces comb teeth 320 (only one is labeled for clarity) of stationary sensing pad 316 on one side and comb teeth 322 (only one is labeled for clarity) of stationary sensing pad 318 on the other side.

Each stationary spoke 324 is coupled by a spring or hinge 326 to hub 302. Stationary spokes 324 are aligned to create a center of rotation for hub 302.

Figure 5:
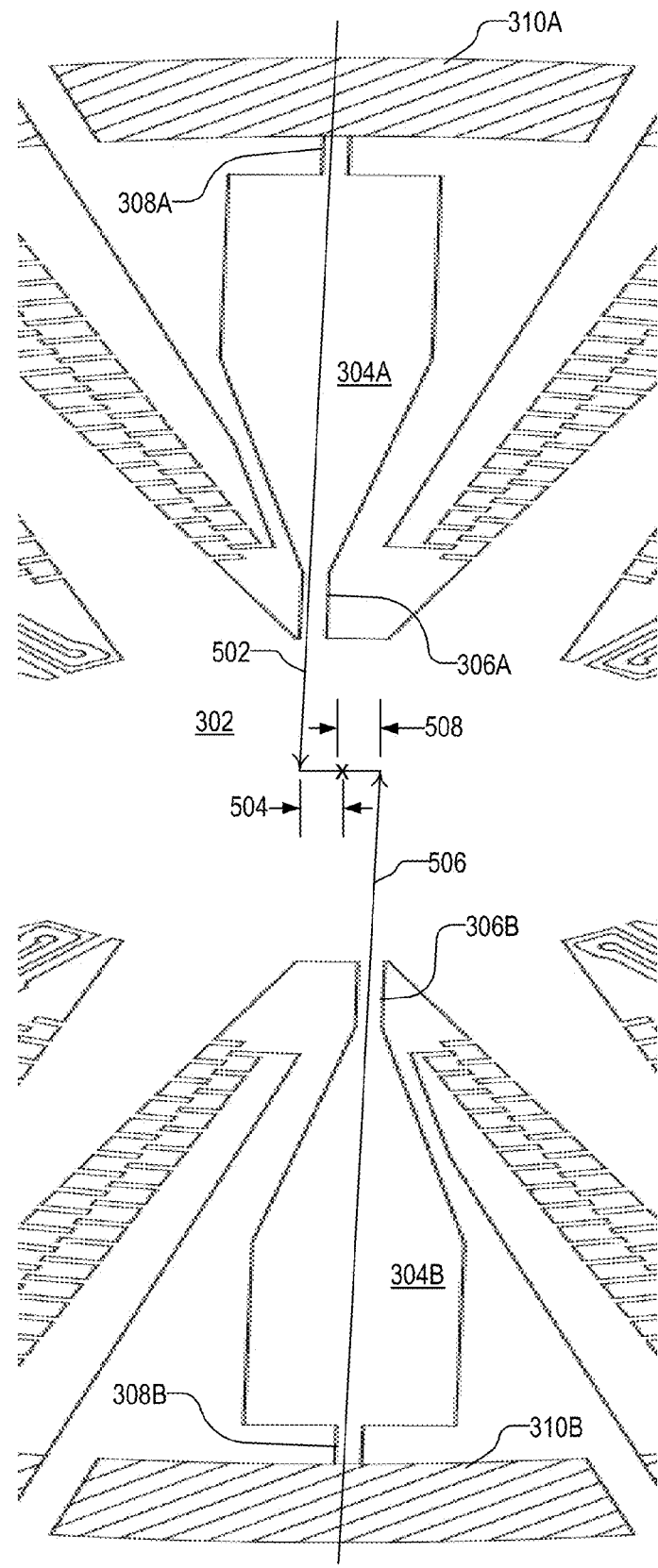
FIG. 5 illustrates another enlarged view of part of FIG. 3 in one embodiment of the invention.

In operation, one or more vertical forces cause movable pads 310A and 310B to move vertically relative to each other, which in turn cause actuator spokes 304A and 304B to move vertically relative to each other. Referring to FIG. 5, the location of the coupling between actuator spoke 304A and hub 302 (i.e., the application point of a vertical force from above) offsets a line of action 502 of the vertical force by a distance 504 from the center of rotation of the hub. Similarly, the location of the coupling between actuator spoke 304B and hub 302 (i.e., the application point of a vertical force from below) offsets a line of action 506 of the vertical force by a distance 508 from the center of rotation of the hub. So configured, the vertical movement of movable pads 310A and 310B is translated and amplified by actuator spokes 304A and 304B into a rotation of hub 302. Referring back to FIG. 4, the rotation of hub 302 rotates sensing spokes 312 relative to the corresponding pairs of stationary sensing pads 316 and 318. The rotation of sensing spokes 312 changes the electrical characteristics (e.g., capacitance) of comb teeth 314, 320, and 322, which can be sensed and converted to determine the load, strain, and other similar characteristics.

Various other adaptations and combinations of features of the embodiments disclosed are within the scope of the invention. Numerous embodiments are encompassed by the following claims.

The invention claimed is:

1. A sensor for converting a force generated externally from the sensor into an electrical signal, comprising:
   at least one stationary sensing pad with a first plurality of comb teeth;
   a hub having a center of rotation;
   a movable pad configured to receive the force;
   a non-radial actuator spoke having:
      an outer end coupled to the movable pad; and
      an inner end coupled by a spring to a location on the hub, wherein the location offsets a longitudinal axis of the non-radial actuator spoke from the center of rotation of the hub; and
   at least one rotatable sensing spoke extending from the hub, the sensing spoke having a second plurality of comb teeth generally interdigitated with the first plurality of comb teeth.

2. The sensor of claim 1, further comprising:
   another movable pad;
   another non-radial actuator spoke having:
      another inner end coupled by another spring to another location on the hub, wherein said another location is diametrically opposed to the location and offsets another longitudinal axis of said another non-radial actuator spoke from the center of rotation of the hub; and
      another outer end coupled to said another movable pad.

3. The sensor of claim 1, wherein each sensing spoke is located between two sensing pads and has comb teeth extending from both sides of the sensing spoke so they are generally interdigitated with comb teeth of the two sensing pads.

4. The sensor of claim 1, wherein the outer end of the non-radial actuator spoke is coupled by another spring to the movable pad.

5. The sensor of claim 4, wherein the force has a line of action through the spring and said another spring.

6. A sensor for converting a force generated externally from the sensor into an electrical signal, comprising:
   at least one stationary sensing pad with a first plurality of comb teeth;
   a hub having a center of rotation;
   a movable pad configured to receive the force;
   a non-radial actuator spoke having:
      an outer end coupled to the movable pad; and
      an inner end coupled by a spring to a location on the hub, wherein the location offsets longitudinal axis of the non-radial actuator spoke from the center of rotation of the hub; and
   at least one rotatable sensing spoke extending from the hub, the sensing spoke having a second plurality of comb teeth generally interdigitated with the first plurality of comb teeth; and
   a plurality of radial stationary spokes coupled by springs to the hub, the radial stationary spokes limiting the hub to rotate about the center of rotation of the hub.

7. The sensor of claim 6, further comprising:
   another movable pad;
   another non-radial actuator spoke having:
      another inner end coupled by another spring to another location on the hub, wherein said another location is diametrically opposed to the location and offsets another longitudinal axis of said another non-radial actuator spoke from the center of rotation of the hub; and
      another outer end coupled to said another movable pad.

8. The sensor of claim 6, wherein each sensing spoke is located between two sensing pads and has comb teeth extending from both sides of the sensing spoke so they are generally interdigitated with comb teeth of the two sensing pads.

9. The sensor of claim 6, wherein the outer end of the non-radial actuator spoke is coupled by another spring to the movable pad.

10. The sensor of claim 9, wherein the force has a line of action through the spring and said another spring.

11. A method for a sensor to convert a force generated externally from the sensor into an electrical signal, comprising:
- receiving the force through a movable pad;
- translating a non-radial actuator spoke with the movable pad;
- rotating a hub with the non-radial actuator spoke, wherein a longitudinal axis of the non-radial actuator spoke is offset from a center of rotation of the hub; and
- sensing a change in capacitance between a first plurality of comb teeth on a rotatable sensing spoke extending from the hub and a second plurality of comb teeth on a stationary sensing pad.

12. The method of claim 11, further comprising:
- receiving another force through an other another movable pad;
- translating an other another non-radial actuator spoke with the other said another movable pad; and
- rotating the hub with the other said another non-radial actuator spoke, wherein another line of action of the other force on longitudinal axis of said another non-radial the other actuator spoke is offset from the center of rotation of the hub.

13. The method of claim 11, further comprising limiting the hub to rotate about the center of rotation of the hub with radial stationary spokes coupled by springs to the hub.

* * * * *